(No Model.)
G. HAVELL.
SHOE OR GLOVE BUTTONER.
No. 322,284. Patented July 14, 1885.
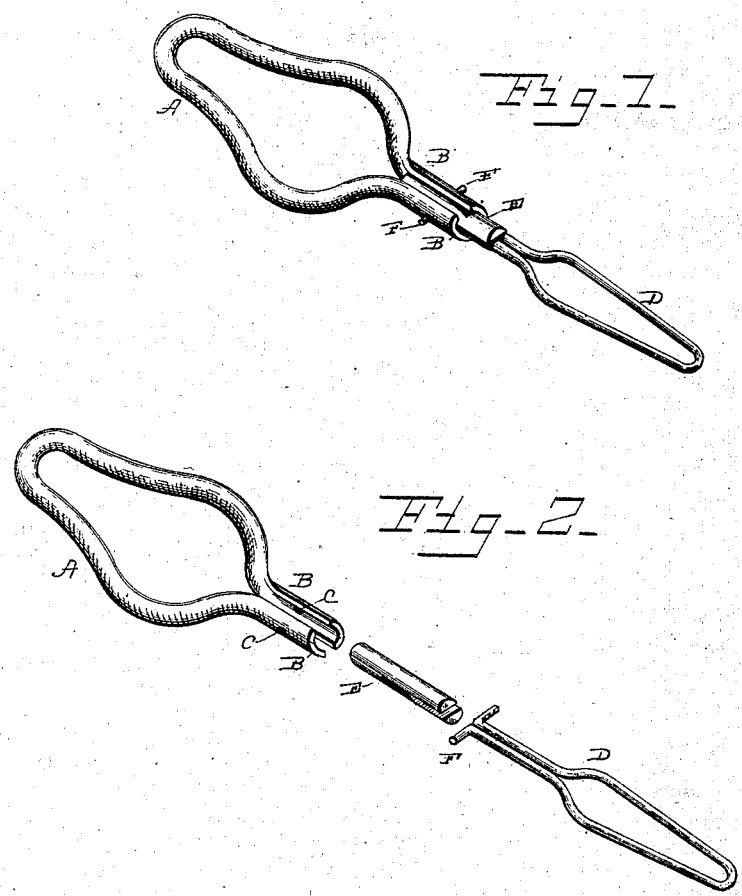
WITNESSES
Edwin L. Yewell,
Chas. D. Davis.
INVENTOR
George Havell
By G. M. Alexander
Attorney

UNITED STATES PATENT OFFICE.

GEORGE HAVELL, OF NEWARK, NEW JERSEY.

SHOE OR GLOVE BUTTONER.

SPECIFICATION forming part of Letters Patent No. 322,284, dated July 14, 1885.

Application filed April 21, 1885. (No model.)

*To all whom it may concern:*

Be it known that I, GEORGE HAVELL, of the city of Newark, county of Essex, and State of New Jersey, have invented certain new and useful Improvements in Shoe or Glove Buttoners; and I do hereby declare that the following is a full, clear, and exact description thereof, reference being had to the accompanying drawings, and to the letters of reference marked thereon, making a part of this specification.

My invention relates to improvements in button-hooks; and it consists in the novel construction and combination of parts, as will be hereinafter set forth.

In the following description reference is had to the annexed drawings, in which Figure 1 represents a perspective view of the device when open and ready for use, and Fig. 2 a similar view with the parts separated.

The handle A is preferably made of one piece of metal, bent as shown, and having the free ends B contiguous and relatively parallel and concaved on their inner surfaces. Through each is a hole, C. The end which engages over the button in operation is preferably formed of wire, and is of such shape as to readily pass over the button at one end, while the other end is narrowed to engage under the head of the said button and around the shank thereof. The free ends of the wire D are approached till they meet, and are parallel for a distance, then abruptly turned at right-angles to the main portion or shank and directly opposite one to the other, as at F. The parallel ends are secured within a longitudinal slot extending partially through the length of a piece, E, preferably of cylindrical shape, forming a bearing-piece for the hook proper. When in position, as in Fig. 1, the piece E rests between the ends B, within the concavities therein, and the right-angle portions F rest within the holes C. The ends B have a slight spring, which permits the hook D to turn on the ends F as spindles and assume the position shown in Fig. 1, where the device is open, or to be closed, the hook D resting within the handle A. The ends B clasp the piece E and prevent any accidental turning of the hook, while sufficient force can easily be exerted to open or shut the device.

The hook D is soldered or otherwise secured in the piece E, and the entire device finished by nickel-plating or other means.

I claim—

A button-hook formed of a handle bent into shape and having its contiguous ends concaved and each provided with a perforation, a hook proper consisting of a wire bent into shape and having contiguous ends with oppositely-projecting right-angle extensions, and a slotted piece receiving the ends of the hook proper and normally resting between the concaved ends of the handle, substantially as and for the purpose specified.

In testimony that I claim the foregoing I have hereunto set my hand and seal this 15th day of April, 1885.

GEORGE HAVELL. [L. S.]

Witnesses:
A. VAN ARSDALE,
H. A. KINGSLEY.